(12) United States Patent
Lan

(10) Patent No.: US 11,134,368 B1
(45) Date of Patent: Sep. 28, 2021

(54) CONVEYING PRECISE CIVIC ADDRESS WITH AN EMERGENCY CALL

(71) Applicant: T-Mobile USA, Inc., Bellevue, WA (US)

(72) Inventor: Wei-Ming Lan, Morrisville, NC (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/887,220

(22) Filed: May 29, 2020

(51) Int. Cl.
*H04W 4/90* (2018.01)
*H04W 4/80* (2018.01)
*H04W 76/50* (2018.01)

(52) U.S. Cl.
CPC ............. *H04W 4/90* (2018.02); *H04W 4/80* (2018.02); *H04W 76/50* (2018.02)

(58) Field of Classification Search
CPC ......... H04W 4/90; H04W 76/50; H04W 4/80; H04W 12/63; H04W 40/20; H04W 4/02; H04W 4/029; H04L 9/0872
See application file for complete search history.

(56) References Cited

U.S. PATENT DOCUMENTS

| | | | |
|---|---|---|---|
| 8,046,169 B2 | 10/2011 | Mazlum et al. | |
| 9,374,673 B2 | 6/2016 | Mendelson | |
| 9,568,585 B2 | 2/2017 | Smith et al. | |
| 9,635,534 B2 | 4/2017 | Maier et al. | |
| 9,961,507 B1 | 5/2018 | Mendelson | |
| 2010/0323715 A1 | 12/2010 | Winters | |
| 2011/0068981 A1* | 3/2011 | Marks | G01S 5/0226 342/451 |
| 2013/0091288 A1* | 4/2013 | Shalunov | H04W 8/005 709/227 |
| 2014/0368382 A1* | 12/2014 | Vartanian | G01S 19/17 342/357.55 |
| 2015/0334545 A1* | 11/2015 | Maier | H04W 4/025 455/404.2 |
| 2016/0249193 A1* | 8/2016 | Edge | H04L 67/42 |
| 2016/0295464 A1* | 10/2016 | Barkan | H04W 76/15 |
| 2017/0171754 A1* | 6/2017 | South | H04W 4/90 |
| 2017/0255966 A1 | 9/2017 | Khoury | |
| 2018/0054721 A1 | 2/2018 | Choe et al. | |
| 2019/0222993 A1 | 7/2019 | Maheshwari et al. | |
| 2019/0230476 A1 | 7/2019 | Qi et al. | |
| 2019/0373464 A1* | 12/2019 | Chari | H04L 41/12 |
| 2020/0145920 A1* | 5/2020 | Shen | H04W 4/38 |
| 2020/0252781 A1* | 8/2020 | Edge | H04W 4/90 |

* cited by examiner

*Primary Examiner* — Minjung Kim
(74) *Attorney, Agent, or Firm* — Lane Powell PC

(57) ABSTRACT

A system for appending an emergency call (e.g., E911) with a location is described herein. The system appends the emergency call to a public safety answering point (PSAP) with a location from which the E911 call occurred. A user equipment (UE), which places the emergency call, connects to the beacon via short-range communication and acquires the location from a beacon. The UE transmits the location to the PSAP via a telecommunications network.

17 Claims, 5 Drawing Sheets

CONVEYING PRECISE CIVIC ADDRESS WITH AN EMERGENCY CALL

BACKGROUND

Wired phone lines (or landlines) used to dominate the telecommunications industry. Determining a location of the landline associated with an emergency call was straightforward since the landline was registered to a fixed physical location. The emergency service could look-up the location of the landline, such as with an ANI (Automatic Number Identification) and ALI (Automatic Location Identification) system or a comparable system. However, as mobile devices have become more ubiquitous, landlines have essentially become obsolete.

Providing a location of the mobile device at the time an emergency service is requested is more complicated than matching an address to which the mobile device is registered because, by its very nature, the mobile device physically moves around, such as moving with its user.

Timely giving location information of a user requesting an emergency service can be the difference between a minor inconvenience and a major catastrophe. When an incorrect or inaccurate location is provided, the emergency service must search for the proper location, which can delay the requested or needed help and potentially cause the requester of the emergency service or others to suffer harm. However, providing the proper location allows the emergency service to efficiently head directly to the physical location of the incident requiring the emergency service. The time delays caused by emergency services needing to search for the location of the incident increase the risk and decrease the safety of the incident for the affected person(s) or situation.

What is needed is a telecommunications network for providing a more accurate location of a user equipment for deployment of emergency services. What is further needed is a telecommunication network for determining the location of the user equipment more efficiently.

DETAILED DESCRIPTION

A system for appending an emergency call (e.g., E911 call) with a location is described herein. To ensure an emergency service can properly locate a user requesting or requiring the emergency service, a location, including an updated or up-to-the-minute location, of the user equipment (UE) can be provided to the emergency service.

The system appends the emergency call to a public safety answering point (PSAP) with a location, such as a civic address, associated with a beacon. The UE connects to the beacon via a short-range communication protocol and requests the location. The location is stored in memory, such as cache memory, of the UE. The UE, upon recognizing the "911" string for the emergency call, retrieves the location from the memory and appends the call with the physical address.

Figure 1:
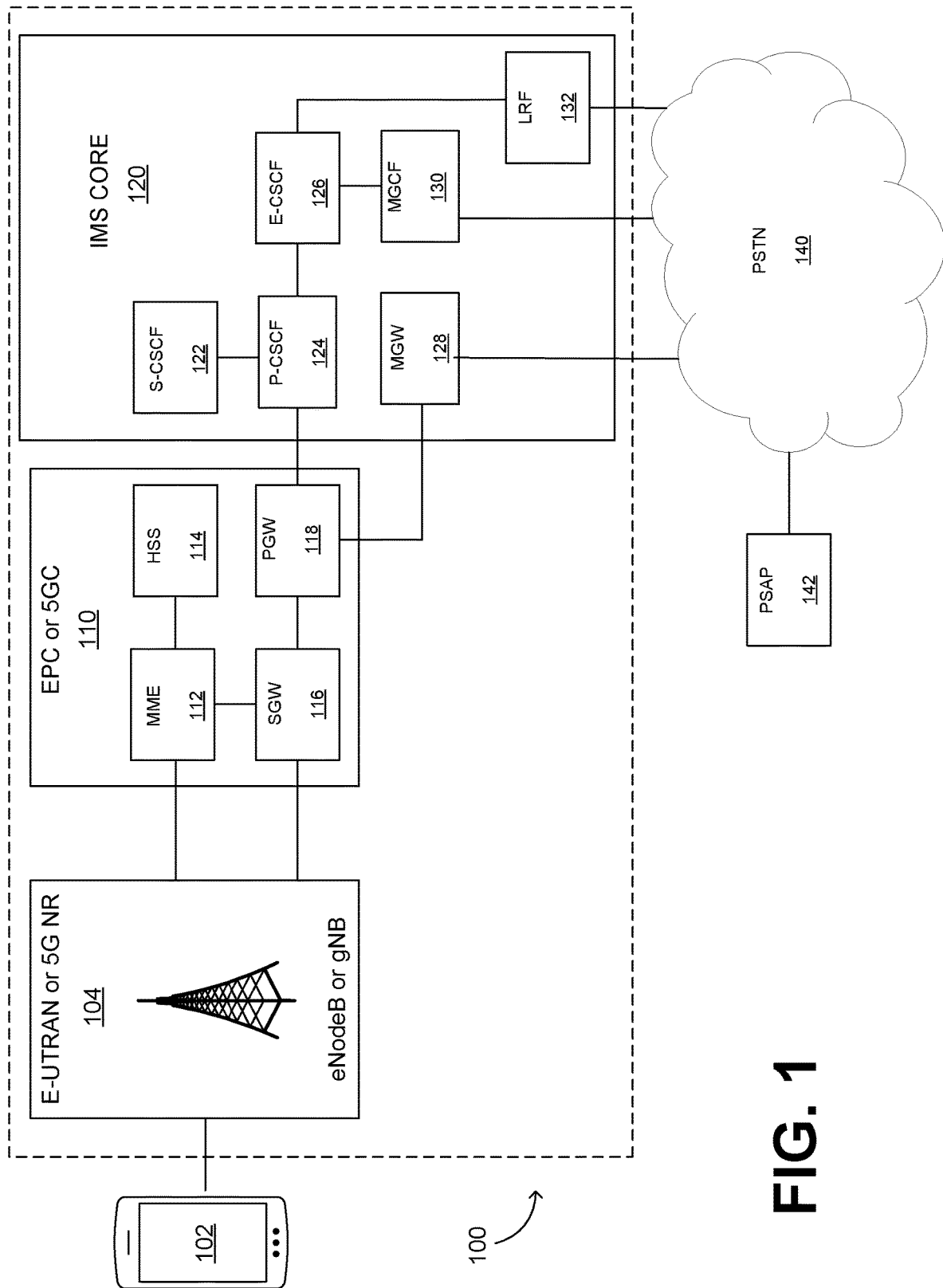
FIG. 1 illustrates an example network.

FIG. 1 shows a system including a telecommunications network 100. The telecommunications network 100 includes an access network (e.g., E-UTRAN; VoLTE; 5G NR; VoNR) 104 which includes a network site (e.g., eNodeB or gNB). The access network 104 transmits data, including data packets, between user equipment (UE) 102 and a public switched telephone network (PSTN) 140, such as through a data core 110 and IP multimedia subsystem (IMS) core 120. The network site controls the UE 102 within a given cell of the telecommunications network 100. For example, the network site sends and receives radio transmission(s) to the UE 102 using analog and digital signal processing functions of an access network air interface. The network site also controls low-level operations of the UE 102 via signaling messages, such as handover commands.

The network site includes a UE communication module programmed to communicate with the UE 102 (i.e., transmit a signal or data). The UE communication module can be an interface, such as a UU or e-Uu interface. The network site also includes a data core communication module programmed to communicate (i.e., transmit a signal or data) with the data core 110. The data core communication module can be an interface, such as a S1, GTP, or NG interface.

The UE 102 is any device used by an end-user for communication or data transmission purposes, including, without limitation, a mobile phone, a smartphone, a tablet, a personal digital assistant, a laptop with mobile connectivity, or the like.

The data core 110 is an IP-based core network infrastructure that provides packet data services, such as to support the convergence of licensed and unlicensed radio technologies (e.g., an evolved packet core (EPC) or 5G Core). The data core 110 can be defined around various paradigms, including mobility, policy management, and security. The four elements of the data core include a home subscriber server (HSS) 114, a mobility management entity (MME) 112, a serving gateway (SGW) 116, and a packet data network gateway (PGW) 118.

The MME 112 pages and authenticates the UE 102. The MME 112 can retain location information at the tracker level for each UE 102 and selects the appropriate gateway during the initial registration process. The MME 112 can connect to the network site via a S1-MME interface and to the SGW 116 via a S11 interface.

The SGW 116 forwards and routes packets (e.g., data packets) to and from the network site and the PGW 118. The SGW 116 connects to the network site via an S1-M and to the PGW 118 via a S5/S8 interface.

The PGW 118 provides connectivity between the UE 102 and external data packet networks, including the IMS 120. The PGW 118 can be connected to a proxy call session control function (P-CSCF) 124 of the IMS 120 via a SGi interface. The PGW 118 can also be connected to a media gateway (MGW) 128 of the IMS 120 via a SGi interface.

The HSS 114 of the data core 110, which is in communication with the MME 112 via a S6 interface, is a database that contains user-related information and subscriber-related information.

The IMS 120, which is an architectural framework for delivering IP multimedia services. The IMS 120 also handles session management and media control. The IMS 120 can communicate with a secondary network, such as the PSTN 140, via a gateway or function. The IMS 120 can include a serving call state control function (S-CSCF) 122, emergency call state control function (E-CSCF) 126, the P-CSCF 124, the MGW 128, and a media gateway control function (MGCF) 130.

The P-CSCF 124 can connect to the S-CSCF 122 via an Mw interface, to the E-CSCF 126 via an Mw interface, and to the PGW 118 via a Gm interface. The P-CSCF 124 can handle registration requests with an emergency public user identifier, detect and prioritize an emergency session, prevent the assertion of an emergency public user identifier in non-emergency requests, query IP connectivity access network, select an E-CSCF 126 in the network to handle the emergency session request, the like, or combinations or multiples thereof.

The S-CSCF 122 can determine the duration of the registration for a received emergency registration. The S-CSCF 122 can also download or request a user profile.

The E-CSCF 126 can receive an emergency session establishment request from the P-CSCF 124, request a location retrieval function (LRF) 132 to retrieve location information (including a validation request), determine or query the LRF 132 for proper routing information or PSAP destination, route emergency session establishment requests to an appropriate destination, forward session initiation protocol requests including UE location information to a PSAP 142, the like, or combinations or multiples thereof.

The MGCF 130 facilitates call control between the IMS 120 and the PSTN 140. The MGCF 130 can connect to the E-CSCF 126 via an Mw interface. The MGW 128 can translate or convert media streams between dissimilar telecommunications networks.

The LRF 132 can connect to the E-CSCF 126 via an Mi interface and to the PSTN 140 via a Le interface. The LRF 132 can retrieve location information for the UE 102 (including interacting with one or more location servers), can route information, the like, or combinations or multiples thereof.

The PSAP 142 is a call center where emergency calls (e.g., police, fire, ambulance) initiated by the UE 102 are received (i.e., where the call terminates). The PSTN 140 can route or direct, whether selectively or otherwise, a call to the PSAP 142, such a as via router or selective router. The PSAP 142 can initiate the emergency service response, such as by dispatching the emergency service provider.

Figure 2:
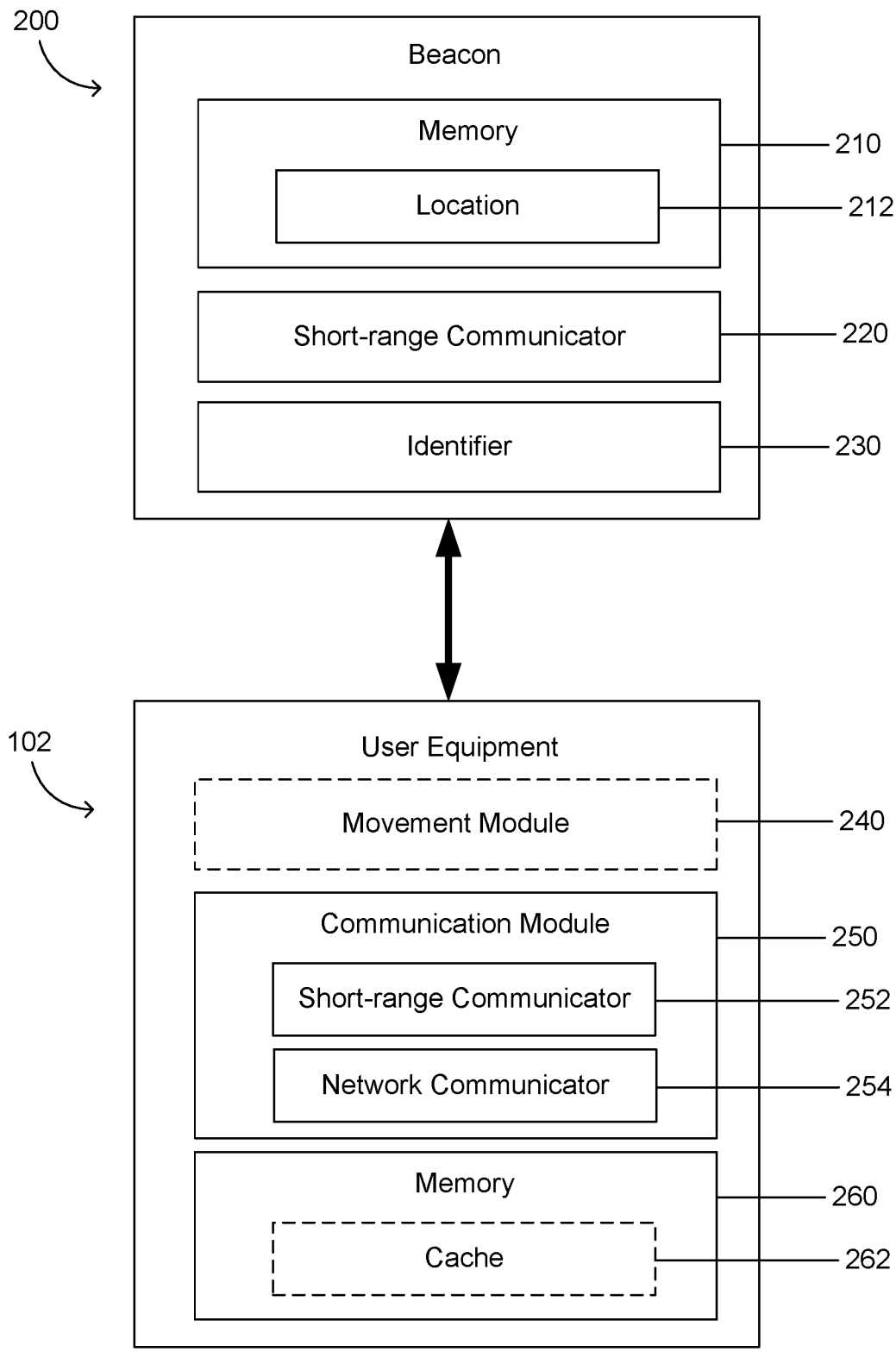
FIG. 2 illustrates a block diagram of an example location system.

FIG. 2 shows a block diagram of a location system including the UE 102 and a beacon 200. The beacon 200 includes memory 210 to store a location 212, including a civic address (e.g., physical address), at which the beacon 200 is located. The civic address can include a building number, a street name, a town, a city, a zip code, a zip plus 4, an identifying location within a building (e.g., floor number, room number directional corner, the like, or combinations thereof), the like, or combinations or multiples thereof. In one example, the location 212 can be pre-programmed (e.g., by a manufacturer) and not changeable when the beacon 200 is intended to be fixed to the location 212. In another example, the location 212 can be re-programmed (i.e., updated, changed, or customized), such as by a user, when the beacon 200 is moved around, placed in a unique location, or the like.

The beacon 200 also includes a short-range communicator 220 to communicate with one or more external devices, such as the UE 102, within range via a short-range communication protocol. The short-range communication protocol can be Bluetooth, Wi-Fi, Zigbee, ultra-wideband, the like, or combinations or multiples thereof. In one example, the short-range communication protocol has a range less than or equal to 10 meters.

The short-range communicator 220 can acquire the location 212 of the UE, such as via a message or instruction to the memory 210, for transmission to the UE 102 via the short-range protocol.

The beacon 200 also includes an identifier 230 to identify the beacon 200 amongst other devices running the same short-range communication protocol within range of the UE 102 that are discoverable by the UE 102. The short-range communicator 220 can broadcast the identifier 230 via the short-range protocol for recognition by the UE 102 when within range. In one example, the UE 102 can select the beacon 200 automatically based on the emergency number or string having been input into the UE 102. In another example, a user or operator can select the beacon 200, such as from a list of discoverable devices running the same short-range communication protocol within range of the UE 102.

The UE 102 includes a communication module 250 including a short-range communicator 252 and a network communicator 254. The short-range communicator 252 communicates with one or more discoverable devices, such as the beacon 200, within range via a short-range communication protocol. The short-range communication protocol can be Bluetooth, Wi-Fi, Zigbee, ultra-wideband, the like, or combinations or multiples thereof. In one example, the short-range communication protocol has a range less than or equal to 10 meters.

The short-range communicator 252 can acquire the location 212 from the beacon 200 for transmission to the PSAP 142 via the telecommunications network 100. To acquire the location 212, the UE 102 initially pairs with or connects to the beacon 200. To pair with or connect to the beacon 200, the UE 102 identifies the beacon 200 based on the identifier 230. When multiple beacons are present, the proper beacon is selected (e.g., automatically by the UE 102 or with user or operator input). The UE 102, via the short-range communicator 252, then sends a pairing request to the short-range communicator 220 of the beacon 200 via the short-range protocol. The beacon 200, via the short-range communicator 220, then sends a pairing response accepting or rejecting the pairing request to the short-range communicator 252 of the UE 102 via the short-range protocol. When the pairing request is accepted, the short-range communicator 252 of the UE 102 and the short-range communicator 220 of the beacon 200 then pair via legacy pairing or a secure connection, including generating a temporary or secure key. A connection, such as an encrypted connection, with the key generated during the pairing step is then established.

The UE 102 can also detect the identifier 230 broadcasted by the beacon 200 via the short-range communication protocol. To detect the identifier 230, the beacon 200 and the UE 102 need not be paired. In other words, the beacon 200 can be identified and selected before the UE 102 and the beacon 200 are paired or connected.

The network communicator 254 communicates with the telecommunications network through the network site, such as via a Uu or e-Uu interface. The network communicator 254 can output or transmit the civic address (e.g., physical address) via a message.

The UE 102 can also include a movement module 240 to determine whether or not the UE 102 has changed locations, including the rate of movement, the direction of movement, or both. By determining whether or not the UE 102 has moved via the movement module 240, the UE 102 can determine whether or not the location stored within the memory 260 is still appropriate to send to the emergency services or if a new location should be acquired via another beacon.

The movement module 240 can include a magnetometer, a gyroscope, an accelerometer, a pedometer, the like, or combinations or multiples thereof. The magnetometer measures magnetic fields and can be used as a compass (i.e. determine orientation), due, at least in part, to the earth's magnetic field. The accelerometer, which measures one or more accelerations, can measure a change in velocity since the acceleration is the first time derivative of the velocity, and a change in position, such as by integrating the acceleration signal. The gyroscope measures either changes in orientation or rotational velocity. The pedometer counts the number of steps taken by a user of the UE 102. In one example, the movement module 240 can include a secondary location determiner to validate or confirm the location or movement. The secondary location determiner can be assisted GPA, Observed Time Difference of Arrival (OT-DOA), the magnetometer, the gyroscope, the accelerometer, the pedometer, the like, or combinations or multiples thereof.

The UE 102 also includes memory 260 to store information, such as the location 212 acquired from the beacon 200, whether temporarily or permanently. One type of memory 260 is cache memory 262. The cache memory 262 is temporary storage which is more readily available or more efficiently retrievable than one or more other types of memory 260. The cache memory 262 can be chip-based.

Figure 3A:
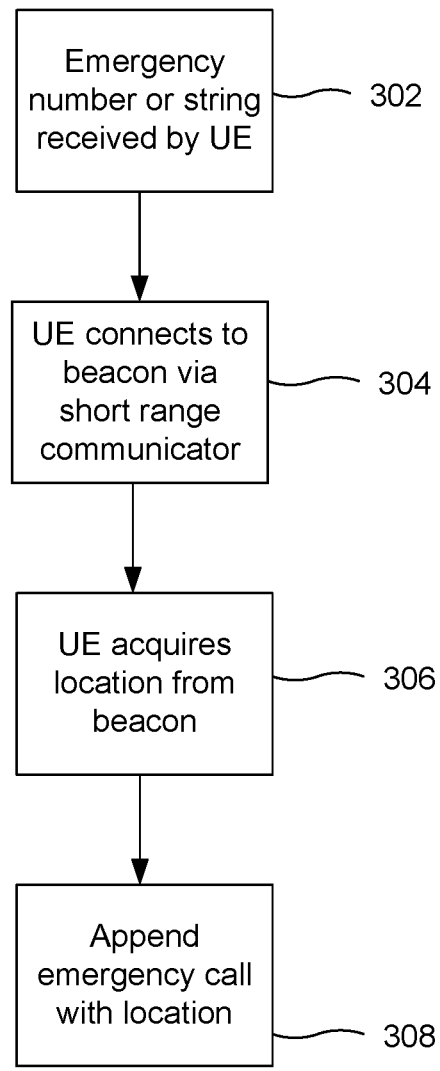
FIG. 3A illustrates a flowchart for an example process for appending a location to an emergency call.

FIG. 3A shows a flowchart for a process for appending an emergency call with a location. At 302, an emergency number or string (e.g., "911") is received by the UE 102 and a call to that emergency number or string is initiated.

At 304, the UE 102 connects to the beacon 200 via the short-range protocol implemented by the short-range communicators 252, 220, respectively. In one example, the UE 102, upon recognizing the emergency number or string, can automatically pair with the beacon 200. In another example, the UE 102, upon recognizing the emergency number of string, displays the beacon 200 or a list of discoverable devices, including the beacon 200, to the user or operator for selection.

At 306, the UE 102 acquires the location 212 from the beacon 200. To acquire the location 212, the UE 102, via the short-range communicator 252, sends a message to the short-range communicator 220 of the beacon 200 via the short-range protocol. The message can include an instruction or a request for the beacon 200 to return the location 212. The beacon 200 processes the message and retrieves the location 212 from the memory 210. The beacon 200, via the short-range communicator 220, then transmits the location 212 to the short-range communicator 252 of the UE 102 via the short-range protocol.

The UE 102 can then store the location 212 in the memory 260. Alternatively, the UE 102 can push the location 212 directly to the PSAP 142 and forego, at least initially, storing the location 212 within the memory 260.

In one example, steps 304 and 306 occur before step 302. The UE 102 connects to the beacon 200 via the short-range protocol implemented by the short-range communicators 252, 220, respectively. The beacon 200 transmits the location 212 to the UE 102, which stores the location 212 in the memory 260. The UE 102 then receives the emergency number or string.

At 308, the location 212 of the beacon 200 is transmitted to the PSAP 142 via the UE 102. The emergency call is appended with the location 212. In the telecommunications network 100, as shown in FIG. 1, the emergency number (e.g., 911) is recognized by the UE 102 and a prioritized communication channel to an emergency access point name is established. In doing so, a default migration path or tunnel is provided for signaling, such that a signaling pathway to initiate a communication session is established. An instruction or request is transmitted from the UE 102 via the access network 104 to the SGW 116 then to the PGW 118. The instruction or request is then transmitted from the PGW 118 to the P-CSCF 124. The P-CSCF 124 detects an emergency request uniform resource identifier (R-URI) from the instruction or request and the SIP INVITE to the E-CSCF 126. The E-CSCF 126, in response to the instruction or request, queries the LRF 132 for the UE 102 location and routes the UE location to the PSAP 142 via the MGCF 130 and the PSTN 140. Alternatively, or additionally, the PSAP 142 can query the LRF 132 for the UE location. Alternatively, or additionally, the LRF 132 can query the UE 102 for the UE location. The S-CSCF 122 also receives an emergency registration via the instruction or request.

Furthermore, a user plane is provided for media, such that a media pathway for a voice service is established. A voice signal is transmitted from the UE 102 via the access network 104 to the SGW 116 then to the PGW 118. The voice signal is then transmitted from the PGW 118 to the MGW 128. The voice signal is routed from the MGW 132 to the PSAP 142 via the PSTN 140.

In other words, the location 212 can be transmitted with the instruction or request to initiate the communication session or in response to a data pass. The voice signal can be transmitted on an established user plane separate from the instruction or request pathway.

Figure 3B:
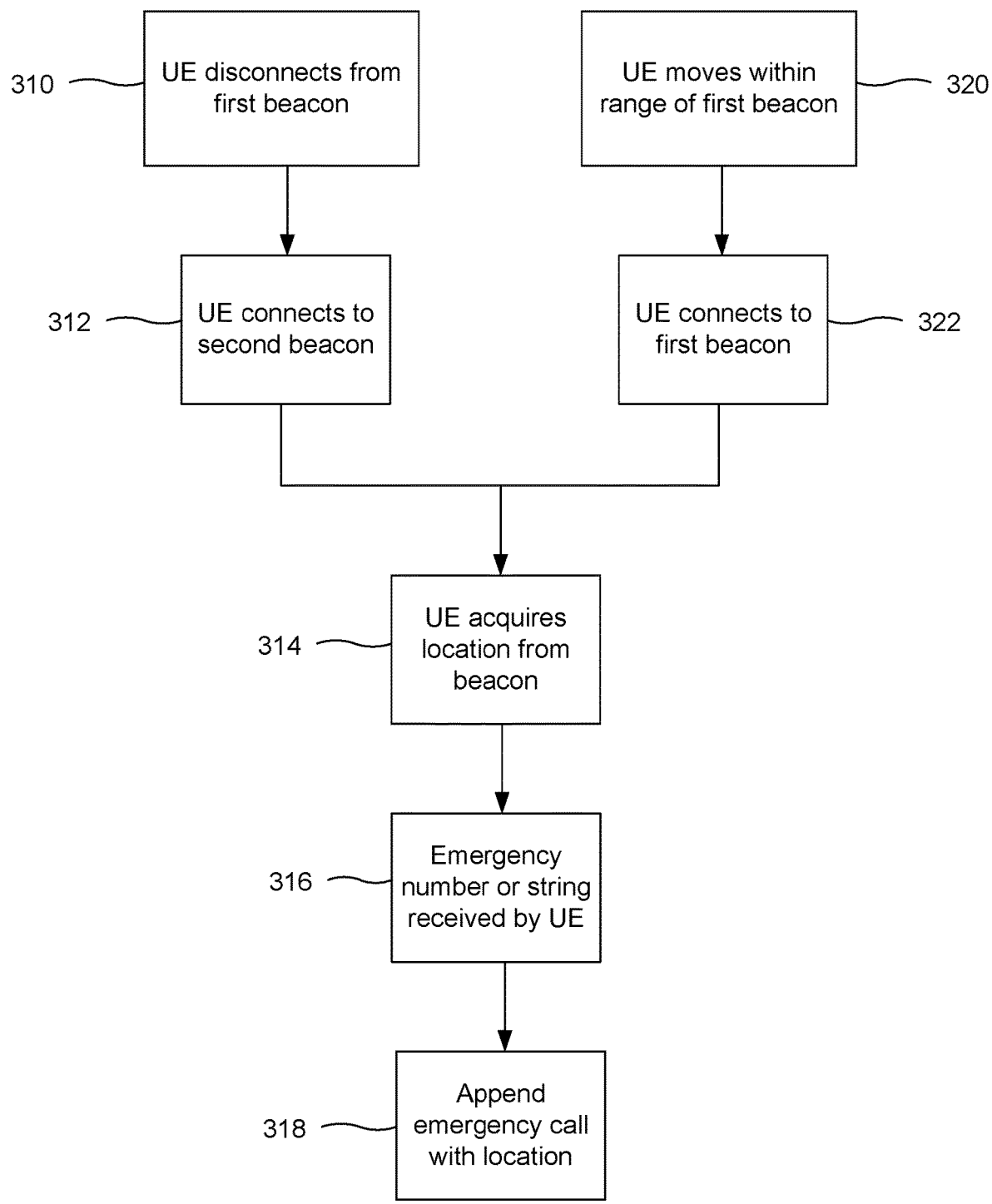
FIG. 3B illustrates a flowchart for another example process for appending a location to an emergency call.

FIG. 3B shows a flowchart for a process for appending an emergency call with a location. At 310, the UE 102 disconnects from a first beacon based on movement of the UE 102. The UE 102 can disconnect from the first beacon because the first beacon is no longer within range of the short-range communicator 252 of the UE 102, because a second beacon (to which the UE 102 subsequently connects) includes a more accurate location (as determined by the movement module 240 of the UE 102, by UE 102 comparison of signal strengths of one or more beacons, or both), or both. At 312, the UE 102 connects to a second beacon within range of the short-range communicator 252 of the UE 102.

Alternatively, at 320 and 322, the UE 102 moves within range of the first beacon, such as by the UE 102 initially entering a building or domicile, and connects to the first beacon.

Figure 4:
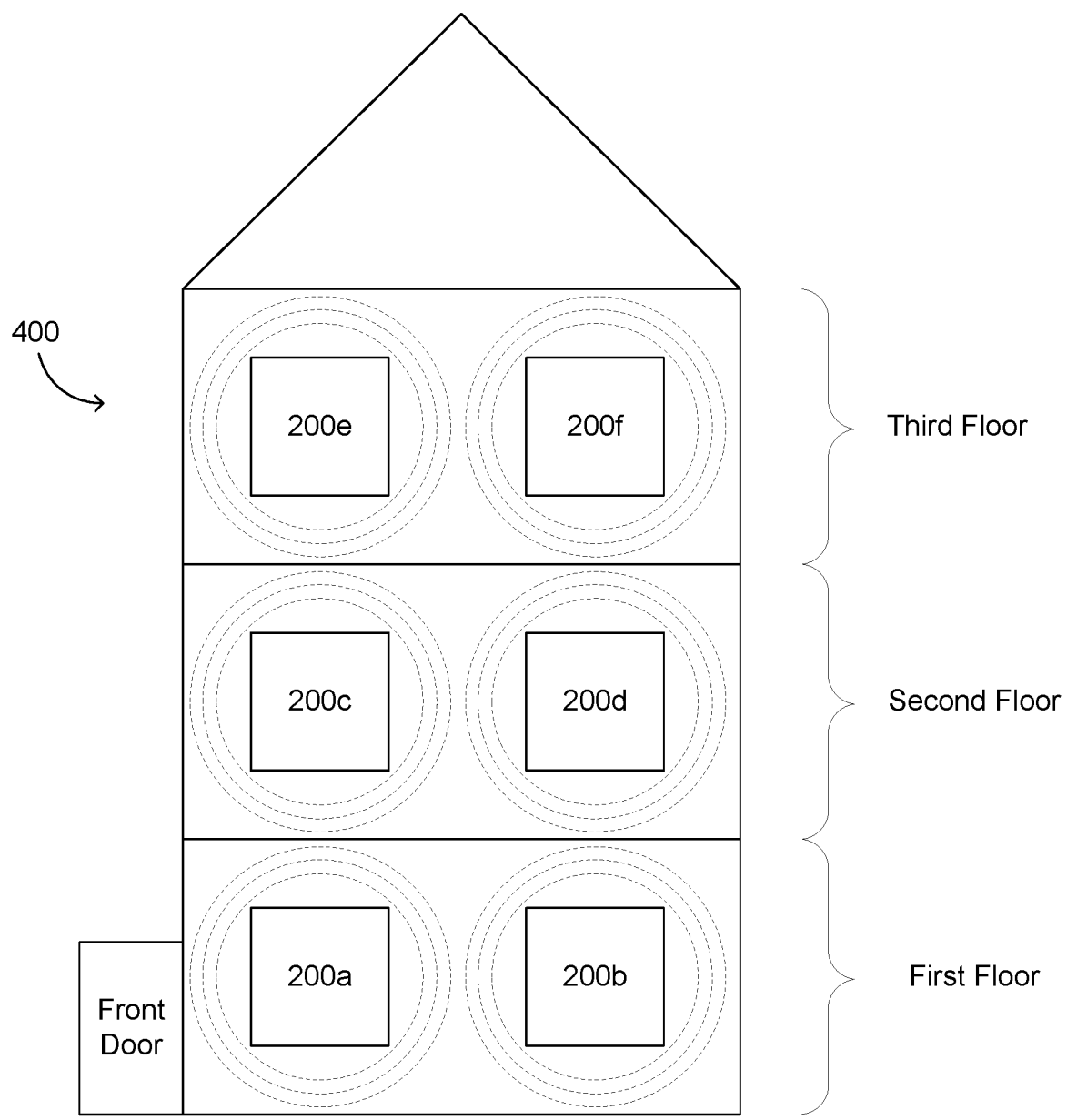
FIG. 4 illustrates a building having multiple example beacons.

For example, as shown in FIG. 4, a building 400 can include multiple beacons 200a-200f. For convenience of discussion, each beacon 200a-200f has a range of 10 meters, as shown by the concentric dashed circles radiating from each beacon 200a-200f. The first floor includes beacons 200a, 200b. The second floor includes beacons 200c, 200d. The third floor includes beacons 200e, 200f. Though the example depicts 3 floors with 2 beacons each, any number of floors, rooms, beacons, or configuration is included.

In one example, the beacons 200a-200f can have different ranges among the beacons 200a-200f (e.g., beacon 200a has a 10 meter range, beacon 200b has a 2 meter range, beacon 200c has a 20 meter range, and so on). In another example, the range of one or more of the beacons 200a-200f can be customized based on the physical space (e.g., a floor of a building is 5 meters by 5 meters, and the beacon range is set to 5 meters even when it has a 10 meter range capability). The ranges can be affected by or customized by transmission power, emission capabilities, or both.

As the UE 102 moves throughout the building 400, the UE 102 pairs to beacon 200a, then unpairs from beacon 200a and pairs with one of the other beacons 200b-200f based on movement of the UE 102. In other words, the UE 102 pairs to the beacon that is closest or most proximal to the UE 102 to provide the most accurate location of the UE 102 when calling an emergency service. To determine the closest or most proximal beacon, the UE 102 can determine the signal strength of the beacons 200a-200f and pair with the beacon having the strongest signal. Alternatively, the UE 102 can display a list to the user or operator showing the available beacons and the respective signal strengths, to permit selection of the closest or most proximal beacon.

Each beacon of the multiple beacons can have a unique identifier (e.g., the beacon 200a can have an identifier of "First Floor, NW Corner," the beacon 200f can have an identifier of "Third Floor, SE Corner," etc.), a unique location (e.g., the beacon 200a can have an identifier of "123 Main Street, Anytown, 09876, First Floor, NW Corner," the beacon 200f can have an identifier of "123 Main Street, Anytown, 09876, Third Floor, SE Corner," etc.), or both. The unique identifier is an identifier which is unique to an individual beacon within range of the UE via the short-range communication protocol, such as when one or more devices use the short-range communication protocol. This permits the beacon to be selected over one or more other devices, such as earbuds, speakers, or the like, which run on or communicate with the same short-range communication protocol.

Returning to FIG. 3B, at 314, the UE 102 acquires a location associated with the second beacon (or the first beacon, where appropriate) from the second beacon (or the first beacon, where appropriate). To acquire the location, the UE 102, via the short-range communicator 252, sends a message to the short-range communicator of the second beacon (or the first beacon, where appropriate) via the short-range protocol. The message can include an instruction or a request for the second beacon (or the first beacon, where appropriate) to return the location. The second beacon (or the first beacon, where appropriate) processes the message and retrieves the location from the memory 210. The second beacon (or the first beacon, where appropriate), via the short-range communicator 220, then transmits the location 212 to the short-range communicator 252 of the UE 102 via the short-range protocol.

The UE 102 can then store the beacon location in the memory 260. The UE 102 can also store the identifier 230 in the memory 260. Alternatively, the UE 102 can push the location 212 directly to the PSAP 142 and forego, at least initially, storing the location 212 within the memory 260.

At 316, an emergency number or string (e.g., "911") is input into the UE 102 and a call to that emergency number or string is initiated.

At 318, the location 212 of the second beacon (or the first beacon, where appropriate) is transmitted to the PSAP 142 via the UE 102. The emergency call is appended with the location. In the telecommunications network 100, as shown in FIG. 1, the emergency number (e.g., 911) is recognized by the UE 102 and a prioritized communication channel to an emergency access point name is established. In doing so, a default migration path or tunnel is provided for signaling, such that a signaling pathway to initiate a communication session is established. An instruction or request is transmitted from the UE 102 via the access network 104 to the SGW 116 then to the PGW 118. The instruction or request is then transmitted from the PGW 118 to the P-CSCF 124. The P-CSCF 124 detects an emergency request uniform resource identifier (R-URI) from the instruction or request and the SIP INVITE to the E-CSCF 126. The E-CSCF 126, in response to the instruction or request, queries the LRF 132 for the location and routes the location to the PSAP 142 via the MGCF 130 and the PSTN 140. Alternatively, or additionally, the PSAP 142 can query the LRF 132 for the location. Alternatively, or additionally, the LRF 132 can query the UE 102 for the location. The S-CSCF 122 also receives an emergency registration via the instruction or request.

Furthermore, a user plane is provided for media, such that a media pathway for a voice service is established. A voice signal is transmitted from the UE 102 via the access network 104 to the SGW 116 then to the PGW 118. The voice signal is then transmitted from the PGW 118 to the MGW 128. The voice signal is routed from the MGW 132 to the PSAP 142 via the PSTN 140.

In other words, the location 212 can be transmitted with the instruction or request to initiate the communication session or in response to a data pass. The voice signal can be transmitted on an established user plane separate from the instruction or request pathway.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for conveying a precise location associated with a physical address at which a user equipment (UE) is physically located, the system comprising:
the UE including:
a processor configured to generate a beacon connection inquiry in response to receiving user input that includes an emergency string, and
a short-range communication module configured to transmit the beacon connection inquiry via a short-range communication protocol; and
multiple beacons each located at different precise locations of the physical address at which the UE is physically located, each respective beacon comprising:
a memory to store a respective precise location of the respective beacon at the physical address, and
a processor configured to:
receive the beacon connection inquiry from the UE, and based on the beacon connection inquiry:
generate a beacon inquiry response that includes the respective precise location of the respective beacon, and
transmit the beacon inquiry response to the UE,
wherein, in response to receiving the beacon inquiry response from the respective beacon of the multiple beacons, the processor of the UE is further configured to:
determine that the respective precise location of the respective beacon is closer in proximity to the UE than a location stored within a memory of the UE, and
based on the determination that the respective precise location of the respective beacon is in closer proximity to the UE than the location stored within the memory of the UE, transmit a communication in response to the emergency string, the communication including the respective precise location of the beacon inquiry response.

2. The system of claim 1, wherein the precise location of the physical address comprises a building number, a street name, a town, an identifying location within a building, a floor number, a room number, a directional corner, or combinations thereof.

3. The system of claim 1, wherein the memory of the UE is further configured to store the respective precise location of the respective beacon inquiry response.

4. The system of claim 1, wherein the beacon inquiry response is received by the UE via the short-range communication module.

5. The system of claim 4, wherein the short-range communication module of the UE transmits and receives messages using a short-range communication protocol that includes Bluetooth, Wi-Fi, Zigbee, or ultra-wideband.

6. The system of claim 4, wherein the short-range communication module of the UE transmits and receives messages from the processor of respective the multiple beacons via the short-range communication protocol.

7. The system of claim 1, wherein the UE transmits the beacon connection inquiry to the respective beacon based on a proximity of the respective beacon to the UE.

8. The system of claim 1, wherein the UE transmits the beacon connection inquiry to the processor of the beacon of the multiple beacons having the strongest signal as determined by the UE.

9. The system of claim 1, wherein the short-range communicator is configured to:
disconnect from a communication session with the processor of the beacon of the multiple beacons, and
transmit a connection inquiry to a processor of another beacon being closest in location to the UE, having the strongest signal as determined by the UE, or both.

10. The system of claim 1, wherein the memory is cache memory.

11. The system of claim 1, wherein the UE further comprises a network communicator configured to communicate with a network site of a telecommunications network.

12. The system of claim 11, wherein the network communicator is further configured to transmit the communication in response to the emergency string to a public safety answering point (PSAP) via the telecommunications network.

13. The system of claim 12, wherein the communication in response to the emergency string is transmitted in response to one or more queries by the PSAP.

14. The system of claim 12, wherein the communication in response to the emergency string is transmitted in response to one or more queries by an emergency call state control function (E-CSCF) or a location retrieval function (LRF).

15. The system of claim 1, wherein the UE further comprises a movement module configured to:
after receiving the beacon inquiry response, determine movement of the UE from a first location to a second location,
transmit another beacon connection inquiry, and
receive another beacon inquiry response.

16. The system of claim 15, wherein, in response to the UE moving from the first location to the second location, the UE is further configured to:
disconnect from the respective beacon having the precise respective location associated with the first location, and
transmit another beacon connection inquiry to another respective beacon having another precise respective location associated with the second location, the other respective beacon being closer in proximity to the second location than the respective beacon associated with the first location.

17. The system of claim 1, wherein each respective beacon of the multiple beacons further comprises a unique identifier associated with the respective beacon.

* * * * *